United States Patent [19]

Ostreicher et al.

[11] Patent Number: 4,783,262

[45] Date of Patent: Nov. 8, 1988

[54] SEPARATOR FOR CELL TYPE FILTER ELEMENT

[75] Inventors: Eugene A. Ostreicher, Farmington; Arto Artinyan, Southington; Robert G. Barnes, Meriden, all of Conn.

[73] Assignee: Cuno Incorporated, Meriden, Conn.

[21] Appl. No.: 32,405

[22] Filed: Mar. 30, 1987

[51] Int. Cl.$^4$ .............................................. B01D 29/26
[52] U.S. Cl. .................................... 210/314; 210/347; 210/487; 55/485; 55/492
[58] Field of Search .................. 55/485, 492; 210/314, 210/331, 346, 486, 487, 347

[56] References Cited

U.S. PATENT DOCUMENTS

| | | | |
|---|---|---|---|
| 3,019,905 | 2/1962 | Baker et al. | 210/486 |
| 3,187,899 | 6/1965 | Prizler | 210/487 |
| 3,315,812 | 4/1967 | Lewis et al. | 210/487 |
| 4,637,877 | 1/1987 | Hartmann et al. | 210/487 |

FOREIGN PATENT DOCUMENTS

| | | | |
|---|---|---|---|
| 204640 | 11/1956 | Australia | 210/486 |
| 1088616 | 3/1955 | France | 210/486 |
| 984401 | 2/1965 | United Kingdom | 210/331 |

*Primary Examiner*—Richard V. Fisher
*Assistant Examiner*—Wanda L. Millard
*Attorney, Agent, or Firm*—Weingram & Zall

[57] ABSTRACT

The present invention sets forth an improved cell type filter cartridge in which the individual cells contain a separator disc having stiffening members formed at the central aperture of the cell and connected to a plurality of the separating ribs in spaced relation to each other. The coaction of the two or more discs with the separator ribs provides for a rigid, box-like structure of the ribs to impart a substantial cantilevered strength to the ribs. Additionally, at least one of the stiffening discs is positioned at or near the ends of the separator ribs to act as a load-bearing surface to prevent media intrusion of the filtering medium and thereby maintain the area of the flow path of the filtered liquid as it passes through the central aperture of the disc.

16 Claims, 3 Drawing Sheets

SEPARATOR FOR CELL TYPE FILTER ELEMENT

BACKGROUND OF THE INVENTION

1. Field of the Invention

The present invention relates to filter cartridges generally and, more particularly, to filter cartridges having a plurality of filter cells which cells include internal cell separators.

2. Description of the Prior Art

Cell type filter cartridges typically are fabricated from individual cells which generally have two layers of filter medium separated from each other so that liquid flows from the outside of the filter medium into the space between the layers of filter medium towards the central portion of the cell. Often the separators that keep the layers of filter medium apart are formed in the shape of discs with ribs radially extending from the central aperture in a spoke-like pattern. The ribs are widest near the central aperture of the cell.

The typical construction of the separator discs poses two problems. First is the loss of filtering area. Though the discs do separate the upper and lower medium layers of the cell, they do not provide rigidity or stiffness to the cells. Therefore, in cartridges having a plurality of cells, the cells tend to droop onto each other so that the adjoining media surfaces will contact each other thereby reducing the effective filtering area of the cartridge. In order to compensate for the lack of stiffness or rigidity in the filter elements, external spacers have been put into the cartridge type filters to separate the cells and maintain them in their proper position for maximum filter area.

The second problem is the loss of fluid flow area through the cell. The ribs of the separator discs within each cell have the narrowest spacing at the ends which form the central aperture of the disc, i.e., the minimum flow area occurs at the point of maximum flow. Therefore, the velocity of the fluid must be greatest at this point of minimum flow area and this high velocity of the fluid flow tends to abrade the filter media. The rib ends extend above any connecting member and contact the inner surface of the media. The media is forced down upon the rib ends by several different forces. First, the swelling of the media during use. Second, the axial forces exerted on the cartridge to force the cells together or sealing means therebetween to prevent seepage of unfiltered liquid between the cells. Third, the hydraulic pressure of the liquid to be filtered forces the filter media against the disc.

The forcing of the media down on the ends of the separating ribs has serious consequences. It forces the filter media down between the separating ribs at the central aperture. This further restricts the passages formed by the separating ribs between the layers of filter medium on each disc. This produces increased resistance to flow as well as increased media abrasion and migration resulting from the high fluid flow velocity in contact with the distorted and damaged filter media at that point.

The attempts to maintain the separation of the cells and other examples of attempts to avoid the problem of media intrusion are shown in several patents, though none have satisfactorily addressed these concerns. For example, U.S. Pat. No. 3,666,107 discloses a filter cartridge comprising a plurality of filter elements each consisting of two dished diaphragm thereto one or more circumferential or radial stiffening members or ribs. Such construction is believed to be difficult to manufacture and would impair to some extent the usable surface area of the filter elements.

A prior art filter cartridge having wafer-like elements but with no additional support therefor is seen in U.S. Pat. No. 2,966,269. This patent discloses a filter assembly including filter cartridges, each constituting a stack of wafers, each wafer being formed from a pair of opposed dished annular discs of filter paper or the like. The discs are secured around their outer peripheral edges, for example by an adhesive, and are spaced apart at their inner peripheral edges by annular spacers between the discs, i.e. within the wafers. The annular spacers have apertures opening into the interior of the wafer. The wafers are stacked together in generally cylindrical form and held together between end plates by tie rods.

Other filter cartridge structures are disclosed in U.S. Pat. Nos. 3,165,471; 4,094,793; 1,102,685; 1,742,919; 2,411,341; 3,178,028; and 4,048,073.

Another example of an improved separator for a cell type filter is shown in the co-pending application, Ser. No. 06/803,819, filed Dec. 2, 1985, which was issued as U.S. Pat. No. 4,704,207, for a filter cartridge including external cell separators, assigned to the assignee of the present invention.

SUMMARY OF THE INVENTION

In order to overcome the difficulties encountered in the prior art, the present invention sets forth an improved cell type filter cartridge in which the individual cells contain a separator disc having stiffening members formed at the central aperture of the cell in spaced relation to each other and connected to a plurality of the separating ribs. The coaction of the two or more stiffening members with the separator ribs provides for a rigid, box-like structure of the ribs to impart a substantial cantilevered strength to the ribs. Additionally, at least one of the stiffening members is positioned at or near the ends of the separator ribs to act as a load-bearing surface to prevent media intrusion of the filtering medium and thereby maintain the area of the flow path of the filtered liquid as it passes through the central aperture of the disc.

Accordingly, it is an object of the present invention to provide an improved cell type filter cartridge which has more uniform dimensions of cells during operation of the filter.

Another object of the present invention is to provide a cell type filter cartridge in which there is reduced contact area between the cells during operation to maintain maximum filter area.

Yet another object of the present invention is to provide a cell type filter cartridge which ensures proper positioning of the cells to maintain maximum filter effectiveness.

It is still another object of the present invention to provide a cell type filter cartridge which prevents distortion of the individual filter cells.

A further object of the present invention is to provide a cell type filter cartridge which allows for greater pressure holding the centers of the cells in position without distorting the filter media.

Another object of the present invention is to provide a cell type filter cartridge which reduces the contact between the cells without interfering with the flow of the filtered material.

It is still another object of the present invention to provide a cell type filter cartridge which has enhanced contact between the fluid conducting core and the interior of the cells forming the cartridge.

Another object of the present invention is to provide a cell type filter cartridge which has cells that do not distort easily under differential pressure or thermal loads.

Yet another object of the present invention is to provide a cell type filter cartridge which is not susceptible to changes in the performance of the filter due to swelling of the filter media.

A further object of the present invention is to provide a cell type filter cartridge which has separator discs in each cell which ensure accurate positioning of the cells for maximum filter efficiency.

It is still another object of the present invention to provide a cell type filter cartridge which has separator discs within the cells which are relatively more rigid and are therefore more efficient.

Another object of the present invention is to provide a cell type filter cartridge which has separator discs within the cells which are resistant to media intrusion and maintain the flow passage for filtered liquid within the cell at an optimum rate.

A further object of the present invention is to provide a cell type filter cartridge which contains a separator disc within the cell which is relatively lighter and stronger.

Yet another object of the present invention is to provide a cell type filter cartridge which contains a separator disc within the cell which is relatively durable and reliable and improves the efficiency of the filter.

It is a further object of the present invention to provide a cell type filter cartridge which contains a separator disc within the cell which is able to be subjected to a greater amount of axial sealing pressure along the cartridge without restricting the flow of the filtered liquid due to media intrusion at the core of the separating disc.

The foregoing and further objects of the invention will be apparent from the following description of the invention. However, although the invention will be described in connection with a preferred embodiment, other variations and modifications will be apparent to those skilled in the art. The invention is defined therefor in the claims following this specification.

DETAILED DESCRIPTION OF THE INVENTION

Figure 1:
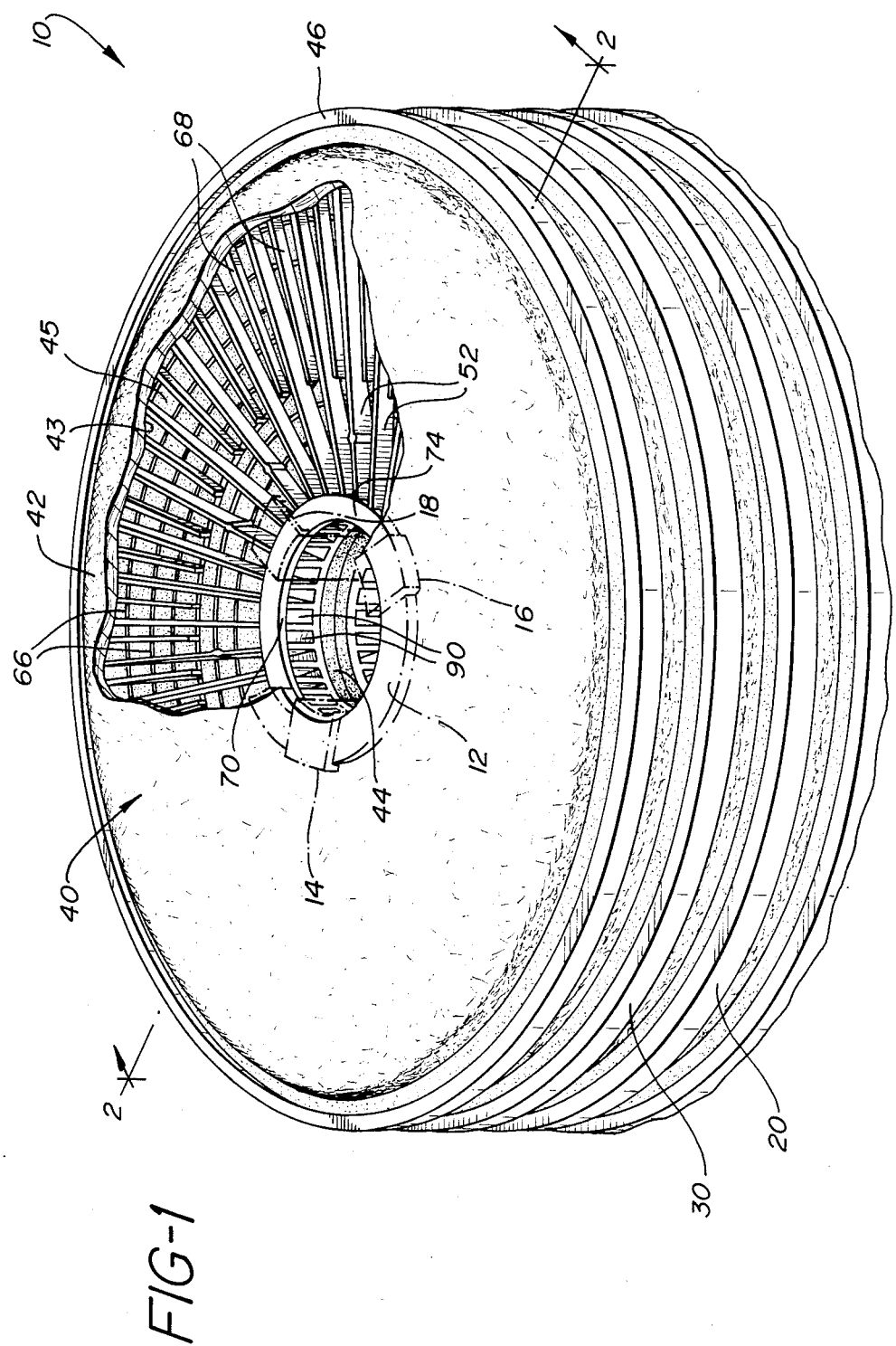
FIG. 1 is a perspective view of the upper portion of a cell type filter cartridge, with the top cell partially broken away.

Referring to the figures, FIG. 1 shows the upper portion of a cell type filter cartridge generally indicated at 10 in which several cells 20, 30, and 40 are stacked together and held in relation to each other by three securing bands 14, 16, and 18. The bands extend from the top of the top cell 40 down the inner elongated central core of the cartridge formed by the central apertures in the individual cells. A gasket retainer 12 prevents the securing bands from crushing the top of the top filter cell 40.

Figure 2:
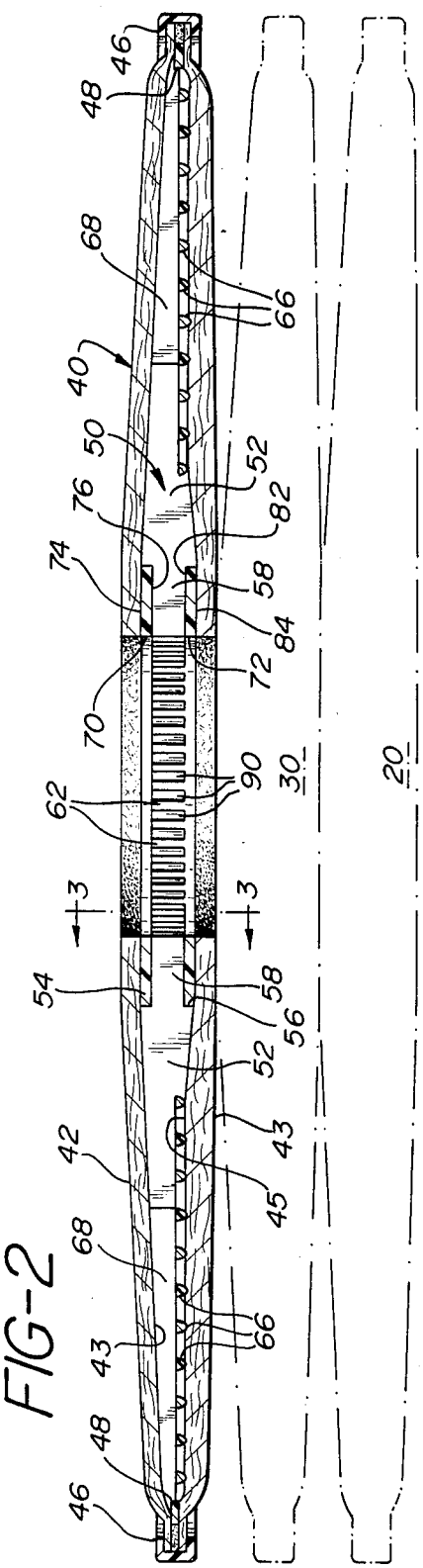
FIG. 2 is a sectional view taken along line 2—2 of FIG. 1.

Referring to FIG. 2, the top filter cell 40 consists of an upper filter media layer 42, having an inner surface 43, and a lower media layer 44, having an inner surface 45. The upper and lower media are circular in shape and are joined by a circular edge seal 46 which grips the upper and lower media on either side of a circular distal rib 48 to form a liquid tight seal at the circumference of the cell.

Each of the cells has a separator member generally indicated at 50 having a plurality of ribs 52 extending the full radius, or major ribs, and other ribs of partial radius extension or minor ribs 68. Each major or full length rib 52 has an upper shoulder 54 and a lower shoulder 56 which form a section 58 adjacent the central aperture, which can also be referred to as a juncture section.

Juncture section 58 of major rib 52 has an axial end surface 62 and a top portion 64. As seen in FIGS. 1 and 2, the major ribs 52 and minor ribs 68 are joined by a plurality of arcuate connecting ribs such as concentrically disposed circular ribs 66. As seen best in FIGS. 2, 3, and 4, upper stiffening disc 70 fits into the top of juncture section 58 of major rib 52, and is positioned against the shoulder 54 on the upper surface of each of the ribs. Upper stiffening disk 70 coacts with lower stiffening disc 72, which may be integrally formed with the major ribs at the time of molding the separator disc. The coaction of the upper stiffening disc 70 and the lower stiffening disc 72 form a spaced box-like structure of high strength and rigidity which insures the dimensional stability of the flow passages 90 formed between the sides of juncture portion 58 and the inner surface 76 of stiffening disc 70 and the inner surface 82 of stiffening disc 72.

Figure 3:
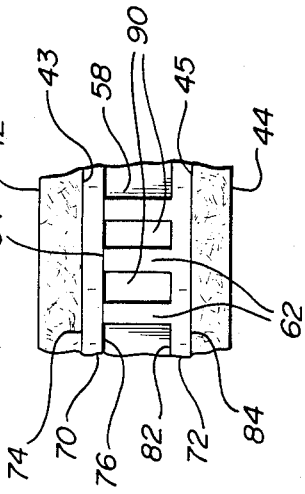
FIG. 3 is a sectional view taken along line 3—3 of FIG. 2.
Figure 2A:
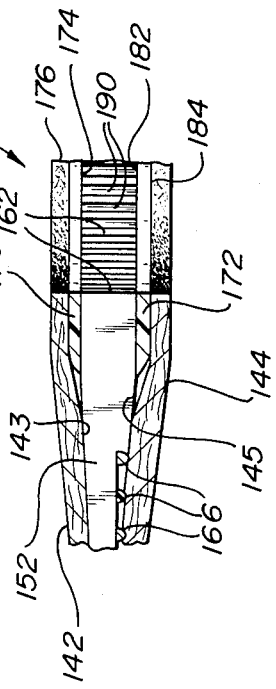
FIG. 2A is a partial view of another embodiment of the invention shown in FIG. 2.

As seen in FIGS. 2 and 3, the outer surfaces 74 and 84 of stiffening discs 70 and 72, respectively, form a continuous surface on which media adjacent the central aperture of the cell can rest and be pressed without the filter media being deformed by the major ribs and/or the stiffening discs. FIG. 2A shows an alternate embodiment of the invention in which the stiffening discs 170 and 172 are positioned on top of the major or full radius separating ribs 152. This will raise the upper and lower media levels 142 and 144 respectively, somewhat off the hub of the disc, leaving a small space which will be of no significance to the operation of the filter cell. The placing of the stiffening discs 170 and 172 above the ends of the major separating ribs provides for a larger surface area of the flow passages 190.

Figure 4:
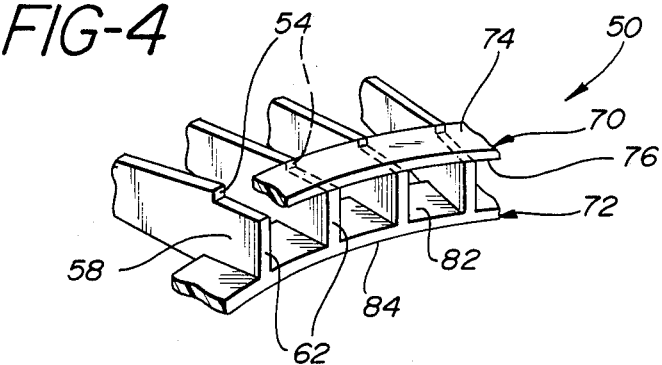
FIG. 4 is a perspective view of a portion of the separated discs shown in FIGS. 2 and 3.

FIG. 4 shows one manner in which the separator disc used in the filter cell of the present invention can be manufactured. In this case, the entire separating disc, in the absence of upper stiffening disc 70, can be injection molded, from a suitable material such as polypropylene, to form a continuous web, and then the upper stiffening disc can be ultrasonically welded or otherwise suitably fastened to the upper surfaces of the juncture portions of the separating ribs.

As can readily be seen, the stiffening discs provide large bearing surfaces, for example, 74 and 84 near the central aperture of the separating disc. These bearing surfaces are capable of supporting relatively large axial forces exerted by the filter housing in which the cartridge is mounted. These axial forces prevent the hydraulic forces acting on the outside of the cells from tending to force the separate cells apart, which would allow unfiltered liquid to enter the elongated central column of the filter cartridge and contaminate the filtered liquid.

The stiffening effect of the entire separating disc results from the box-like structure at the central aperture of the disc produced by the spaced displacement of the stiffening discs in coaction with the separator ribs. The box-like structure produces a torsional rigidity that maintains the major separator ribs in an upright and parallel relationship. The major separator ribs coact with the minor separator ribs via arcuate concentrically disposed connecting ribs 66 so that all of the separator ribs, which are relatively high with respect to their width, are positioned for maximum resistance to bending loads exerted on the separator disc. Therefore, the greater stiffness of the separator discs tends to hold the peripheral portions of the individual cells in the proper position in relation to the central portion of the cell, thereby producing maximum filtering efficiency for each cell. It should be noted that while the embodiments show a plurality of arcuate ribs positioning the separator ribs, any continuous sheet or other connecting means would also be suitable. The major function of the secondary connector is to radially position the separator ribs which when coacting with the stiffeners provide the resistance to bending.

Figure 5:
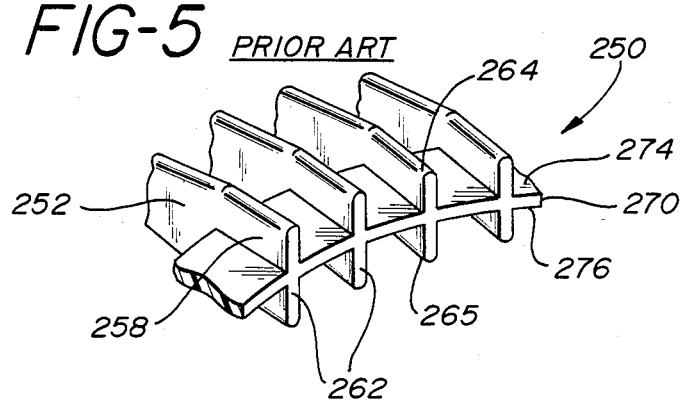
FIG. 5 is a fragmentary view in perspective of a portion of a separate disc known in the prior art.
Figure 6:
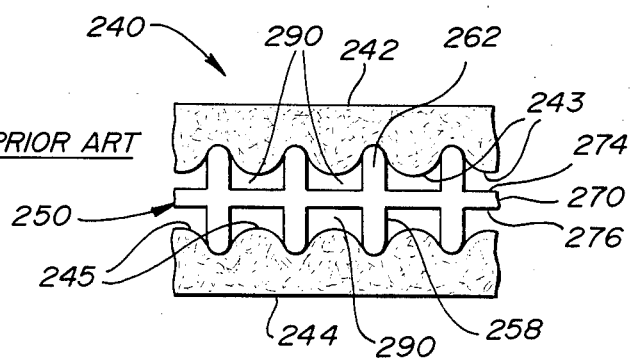
FIG. 6 is a sectional view of a portion of a cell type filter element using the separator disc shown in FIG. 5.

The prior art discs shown in FIGS. 5 and 6 have only a single disc 270 to connect separator ribs 252 from each other. The ribs are free to twist and this twisting motion will tend to allow the entire disc to bend or deflect with relatively little resistance. Therefore, the individual cells will tend to contact each other when deflected, reducing the effective surface area of the filtering media.

Additionally, because of the protruding ends 264 and 265 of the separator ribs which contact the inner surfaces 243 and 245 of the upper and lower media layers 240 and 244, the flow passages 290 are constricted, restricting the flow of filtered fluid into the central aperture of the cartridge. Also, as can be seen, the more axial pressure that is applied on the media near the central aperture of the cell, the greater will be the media intrusion into the flow channels. This media intrusion is not present near the central aperture of the cells of the present invention because of the presence of the stiffening discs.

It should be noted that it is possible to have more than the two stiffening discs as shown in FIG. 2, or FIG. 2A. incorporated in a separating disc. Nor must the stiffening discs bo located only on the top portions of the separator ribs. There could, for example, be a combination of the separator disc shown in FIG. 2A with an intermediate connecting disc used to join the spacing ribs prior to the positioning separate stiffening discs 170 and 172. Additionally, while not shown, it is conceivable that the separator ribs adjacent the stiffening discs may protrude slightly above the stiffening discs or disc in order to position the spacer disc with respect to the filter media.

As will be readily apparent to those skilled in the art, the invention may be used in other specific forms or for other purposes without departing from its spirit or central characteristics. The present embodiments are therefore to be considered as illustrative and not restrictive, the scope of the invention being indicated by the claims rather than by the foregoing description, and all embodiments which come within the range of equivalence of the claims are intended to be embraced.

What is claimed is:

1. A filter cartridge comprising:
    a plurality of filter cells having apertures in registration to form an elongated axial fluid passage;
    at least one of said plurality of filter cells being a relatively flat, circular filter cell comprising:
    upper and lower circular layers of filter media;
    a separator disc disposed between said upper and lower circular layers of filter media;
    a central aperture communicating said filter cell with said elongated axial fluid passage;
    said separator disc comprising:
        a plurality of separator ribs extending radially from said central aperture in said separator disc;
        each of said separator ribs having upper and lower surfaces;
        a plurality of arcuate connecting ribs disposed about said central aperture and connecting said separator ribs in fixed relation;
        a plurality of stiffening members disposed in axially spaced relation about said central aperture and connected to said plurality of separator ribs;
        said stiffening members coacting with said separator ribs to form flow passages between adjacent pairs of said separator ribs communicating said central aperture with the inner surfaces of said upper and lower layers of filter media; and
        at least one of said stiffening members having a flat upper or lower surface and being disposed to coact with the adjacent top or bottom surfaces of said separator ribs to provide a flat surface area for contact of the separator disc with the surface of the adjacent media layer.

2. The filter cartridge as in claim 1, wherein said stiffening members comprise discs fastened to the adjacent upper and lower surfaces of said separator ribs adjacent said central aperture.

3. The filter cartridge as in claim 2, further comprising:
    a plurality of minor ribs radially extending between said separator ribs;
    a plurality of concentrically disposed circular connecting ribs connecting said minor ribs and said separator ribs; and
    said separator ribs, minor ribs, and circular connecting ribs forming a continuous web.

4. The filter cartridge as in claim 3 further comprising:
    a plurality of securing bands extending axially along said cartridge and exerting axial force to hold the cartridge together; and
    said stiffening discs providing a bearing surface for said filter media in contact therewith in response to axial forces exerted on said cartridge.

5. The filter cartridge as in claim 3, wherein said stiffening disc coact with said separator ribs in parallel relation to each other and thereby resist bending of said spacer disc, and of the filter cell.

6. A cell for a cartridge type filter comprising:
a separator disc;
upper and lower layers of filter media separated by said separator disc and joined at the circumference of the cell;
a central aperture in said cell for passage of fluid extending through said separator disc and said upper and lower layers of filter media;
said separator disc comprising:
separator ribs radially disposed and extending from and defining the central aperture of the separator disc to the circumference of the disc and providing unimpeded fluid flow therethrough;
circular connecting ribs circumferentially disposed about the central aperture to radially position said separator ribs remotely from said central aperture; and
stiffening members connected in axially spaced relation to said separator ribs adjacent said central aperture to maintain said separator ribs in parallel axial relationship.

7. The filter cell as in claim 6, wherein:
at least one of said stiffening members comprises an annular disc;
said annular disc is connected to the ends of said separator ribs at the central aperture of the cell and is positioned with relation to the radially extending separator ribs so as to contact the inner surface of the adjacent layer of filter media.

8. The filter cell as in claim 7 further comprising:
a plurality of annular discs connected to the ends of said separator ribs at the central aperture of the cell;
the inner surfaces of said upper and lower media layers in contact with the adjacent annular disc at the central aperture of the filter cell; and
said annular discs coacting with said radially extending separator ribs to form flow paths from the inner surfaces of said media layers to the central aperture of the cell.

9. The filter cell as in claim 8, further comprising:
a plurality of minor spacing ribs disposed between said separator ribs;
said minor spacing ribs extending from the circumference of the cell to a location distal to the central aperture of the cell; and
said minor spacing ribs connected with said radially separator ribs via connection with said circumferential connecting ribs.

10. A spacer member for a filter cell comprising:
a plurality of spacer ribs extending from a central aperture;
a plurality of arcuate ribs connecting said spacer ribs to form a continuous web;
a plurality of stiffening members in vertically spaced relation connected with said plurality of spacer ribs; and
said plurality of stiffening members coacting with said plurality of spacer ribs to form flow passages between adjacent pairs of said spacer ribs in the central aperture of said spacer member.

11. A spacer member for positioning within a filter cell comprising:
a plurality of spacer ribs defining and extending from a central aperture and providing unimpeded fluid flow therethrough;
a plurality of arcuate ribs connecting said spacer rubs to form a continuous web;
a plurality of stiffening members in vertically spaced relation connected with said plurality of spacer ribs; and
said plurality of stiffening members coacting with said plurality of spacer ribs to position and support said spacer ribs in parallel relation to resist deflection of said spacer ribs.

12. A spacer member for a filter cell as in claim 1 or 2, further comprising a plurality of minor ribs disposed between said separator ribs and connected to said arcuate connecting ribs.

13. A spacer member for a filter cell as in claim 1 or 2, wherein said plurality of separator ribs are radially disposed.

14. A spacer member for a filter cell as in claim 1 or 2, wherein said arcuate connecting ribs comprise a series of concentrically disposed circular ribs.

15. A spacer member for a filter cell as in claim 1 or 2, wherein said plurality of stiffening members comprise a plurality of circular discs, at least one of said circular discs disposed to form a continuous surface on the upper side of said separator ribs.

16. A spacer member for a filter cell comprising:
a plurality of spacer ribs defining and extending from a central aperture;
means connecting said plurality of spacer ribs to form a continuous web;
a plurality of stiffening members in vertically spaced relation connected with said plurality of spacer ribs;
said plurality of stiffening members coacting with said plurality of spacer ribs to position and support said spacer ribs in parallel relation to resist deflection of said spacer ribs; and
said plurality of stiffening members coacting with said plurality of spacer ribs to form flow passages between adjacent pairs of said spacer ribs in the central aperture of said spacer rib.

* * * * *